US007568666B2

(12) United States Patent
Kennedy

(10) Patent No.: US 7,568,666 B2
(45) Date of Patent: Aug. 4, 2009

(54) STAND FOR SUPPORTING AN ARTICLE RELATIVE TO A FLOOR

(75) Inventor: Gregg L. Kennedy, Cleveland, OK (US)

(73) Assignee: Air Power Systems Co., Inc., Tulsa, OK (US)

( * ) Notice: Subject to any disclaimer, the term of this patent is extended or adjusted under 35 U.S.C. 154(b) by 0 days.

(21) Appl. No.: 11/726,138

(22) Filed: Mar. 21, 2007

(65) Prior Publication Data
US 2008/0230659 A1 Sep. 25, 2008

(51) Int. Cl.
F16L 3/00 (2006.01)
(52) U.S. Cl. ........................... 248/121; 248/131
(58) Field of Classification Search .............. 248/121, 248/124.1, 125.8, 131, 149, 406.1, 407, 177.1, 248/418, 188.5, 158; 403/263, 300, 341, 403/361, 364; 411/190, 332, 221, 197, 204, 411/160, 161
See application file for complete search history.

(56) References Cited

U.S. PATENT DOCUMENTS

| 3,570,796 | A |   | 3/1971 | Capps |  |
|---|---|---|---|---|---|
| 4,240,603 | A |   | 12/1980 | Chiariello |  |
| 4,284,257 | A |   | 8/1981 | Murkens |  |
| 5,458,305 | A | * | 10/1995 | Woodward | ............. 248/121 |
| 5,636,815 | A |   | 6/1997 | Wilson |  |
| 5,775,652 | A |   | 7/1998 | Crawshaw et al. |  |
| 5,839,704 | A | * | 11/1998 | Appleman | ............. 248/178.1 |
| 6,390,424 | B1 |   | 5/2002 | Kidushim et al. |  |
| 6,520,192 | B1 | * | 2/2003 | Lo | ............. 135/25.4 |
| 7,040,591 | B1 |   | 5/2006 | Simon |  |
| 2003/0071177 | A1 | * | 4/2003 | Aussiker | ............. 248/125.8 |
| 2003/0090904 | A1 | * | 5/2003 | Ching | ............. 362/413 |
| 2005/0263653 | A1 |   | 12/2005 | Brown, Jr. |  |
| 2007/0034753 | A1 | * | 2/2007 | Lee | ............. 248/121 |
| 2008/0061195 | A1 | * | 3/2008 | Carnevali | ............. 248/125.8 |
| 2008/0153606 | A1 | * | 6/2008 | Koop et al. | ............. 464/83 |

* cited by examiner

Primary Examiner—Ramon O Ramirez
(74) Attorney, Agent, or Firm—MacMillan, Sobanski & Todd, LLC

(57) ABSTRACT

A stand quickly and reliably supports an article at a desired location relative to a floor or other support surface for convenient use. The stand includes a base portion that is adapted to engage a support surface. A post portion includes a lower member connected to the base portion, an intermediate member, and a first coupling that prevents axial and rotational movement of the lower member relative to the intermediate member. The post portion also includes an upper member and a second coupling that prevents axial and rotational movement of the intermediate member relative to the upper member. Lastly, the stand includes a platform portion that is adapted to support an article. The lower member, the intermediate member, and the upper member of the post portion are each hollow and provide a passageway that extends from an opening formed through the base portion to an opening formed through the platform portion.

18 Claims, 3 Drawing Sheets

STAND FOR SUPPORTING AN ARTICLE RELATIVE TO A FLOOR

BACKGROUND OF THE INVENTION

This invention relates in general to a stand for an article relative to a floor or other support surface. In particular, this invention relates to an improved structure for such a stand that quickly and reliably supports the article at a desired location relative to the floor or other support surface for convenient use.

Stands are widely used to support a variety of articles relative to a floor or other support surface for convenient use. A typical stand includes a base portion that is adapted to engage the floor or other support surface, a post portion that extends upwardly from the base portion, and a platform portion that is supported on the upper end of the post portion and is adapted to support the article during use. In many instances, one or more of the portions of the stand are capable of movement relative to one another to facilitate the positioning of the article relative to the floor or other support surface for convenient use. Although known stand structures have been effective, it would be desirable to provide an improved structure for a stand that quickly and reliably supports the article at a desired location relative to the floor or other support surface for convenient use.

SUMMARY OF THE INVENTION

This invention relates to an invention relates to an improved structure for a stand for quickly and reliably supporting an article at a desired location relative to a floor or other support surface for convenient use. The stand includes a base portion that is adapted to engage a support surface. A post portion includes a lower member connected to the base portion, an intermediate member, and a first coupling that prevents axial and rotational movement of the lower member relative to the intermediate member. The post portion also includes an upper member and a second coupling that prevents axial and rotational movement of the intermediate member relative to the upper member. Lastly, the stand includes a platform portion that is adapted to support an article. The lower member, the intermediate member, and the upper member of the post portion are each hollow and provide a passageway that extends from an opening formed through the base portion to an opening formed through the platform portion.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
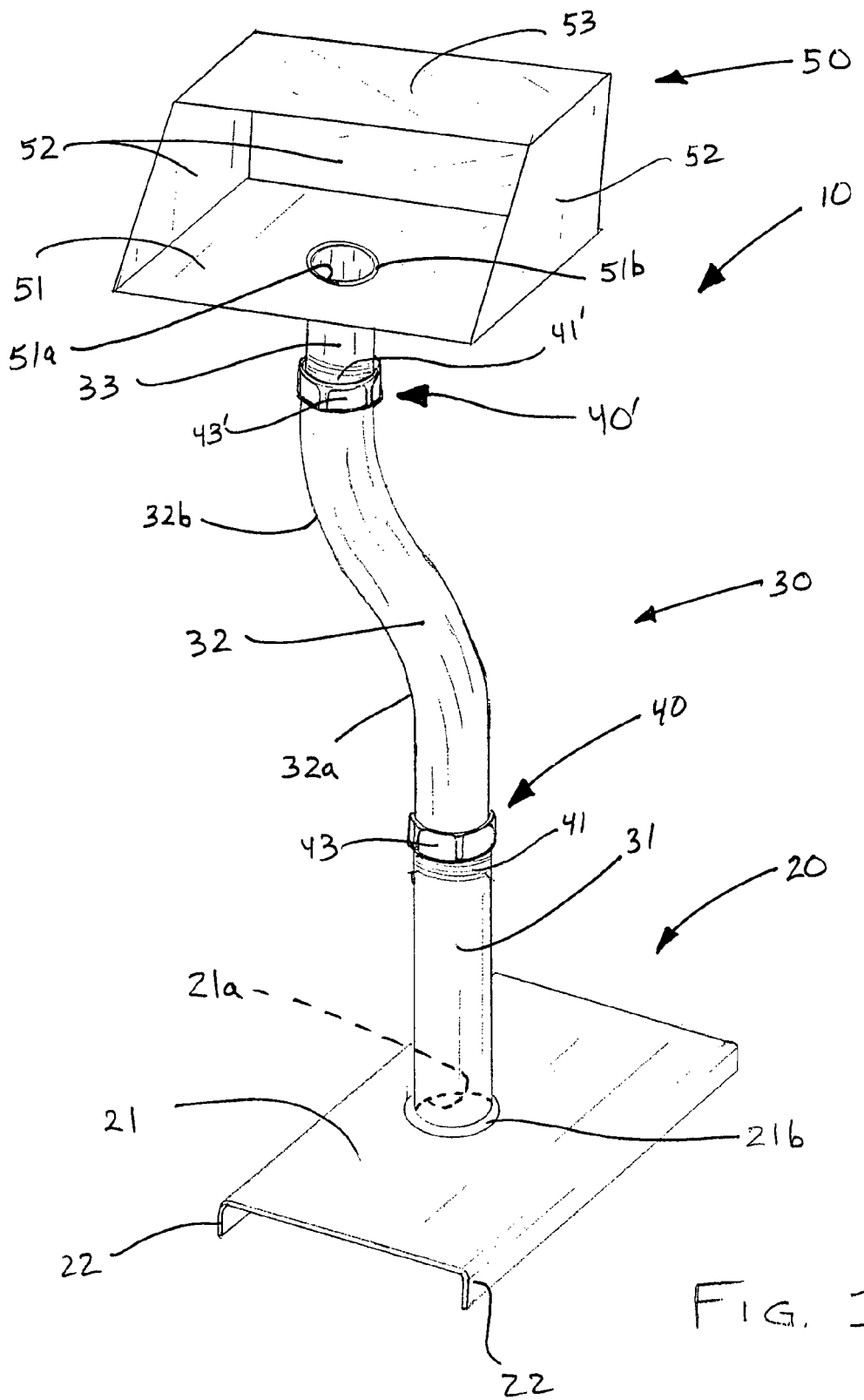
FIG. 1 is a perspective view of a stand for quickly and reliably supporting an article at a desired location relative to a floor or other support surface in accordance with this invention.

Referring now to the drawings, there is illustrated in FIG. 1 a stand, indicated generally at 10, for quickly and reliably supporting an article (not shown) at a desired location relative to a floor (not shown) or other support surface in accordance with this invention. The stand 10 includes a base portion, indicated generally at 20, that is adapted to engage the floor or other support surface. In the illustrated embodiment, the base portion 20 of the stand 10 has an upper panel 21 and a pair of depending panels 22 that are adapted to engage the floor or other support surface. Thus, the upper panel 21 is supported above the floor or other support surface, and the ends of the base portion 20 are open. As shown in FIG. 1, the upper panel 21 has an opening 21a formed therethrough. The purpose of this opening 21a will be explained below. The base portion 20 may be formed from a single sheet of a rigid material, such as a metallic plate, having opposed sides that are deformed to form the depending panels. However, it will be appreciated that the base portion 20 may be formed having any desired structure.

The stand 10 also includes a post portion, indicated generally at 30, that extends upwardly from the base portion. In the illustrated embodiment, the post portion 30 includes a lower member 31, an intermediate member 32, and an upper member 33. Although three of such members 31, 32, and 33 are shown in the illustrated embodiment, it will be appreciated that the post portion 30 may be provided with either a lesser or greater number of such members 31, 32, and 33. Preferably, the members 31, 32, and 33 are formed from a rigid material or a combination of rigid materials. For example, each of the members 31, 32, and 33 may be formed from a metallic material. However, the members 31, 32, and 33 may be formed from any desired material or combination of materials.

For a reason that will be explained below, each of the members 31, 32, and 33 is preferably hollow, although such is not required. In the illustrated embodiment, each of the members 31, 32, and 33 is formed in the shape of a hollow tube. The lower member 31 and the upper member 33 are each generally linearly-shaped. The intermediate member 32 is generally S-shaped, having first and second curved regions 32a and 32b. In the illustrated embodiment, the curved regions 32a and 32b are shaped such that the upper and lower ends of the intermediate member 32 extend generally parallel to one another, but are axially offset by a predetermined amount. However, it will be appreciated that each of the members 31, 32, and 33 can be formed having any desired shape or combination of shapes.

Figure 2:
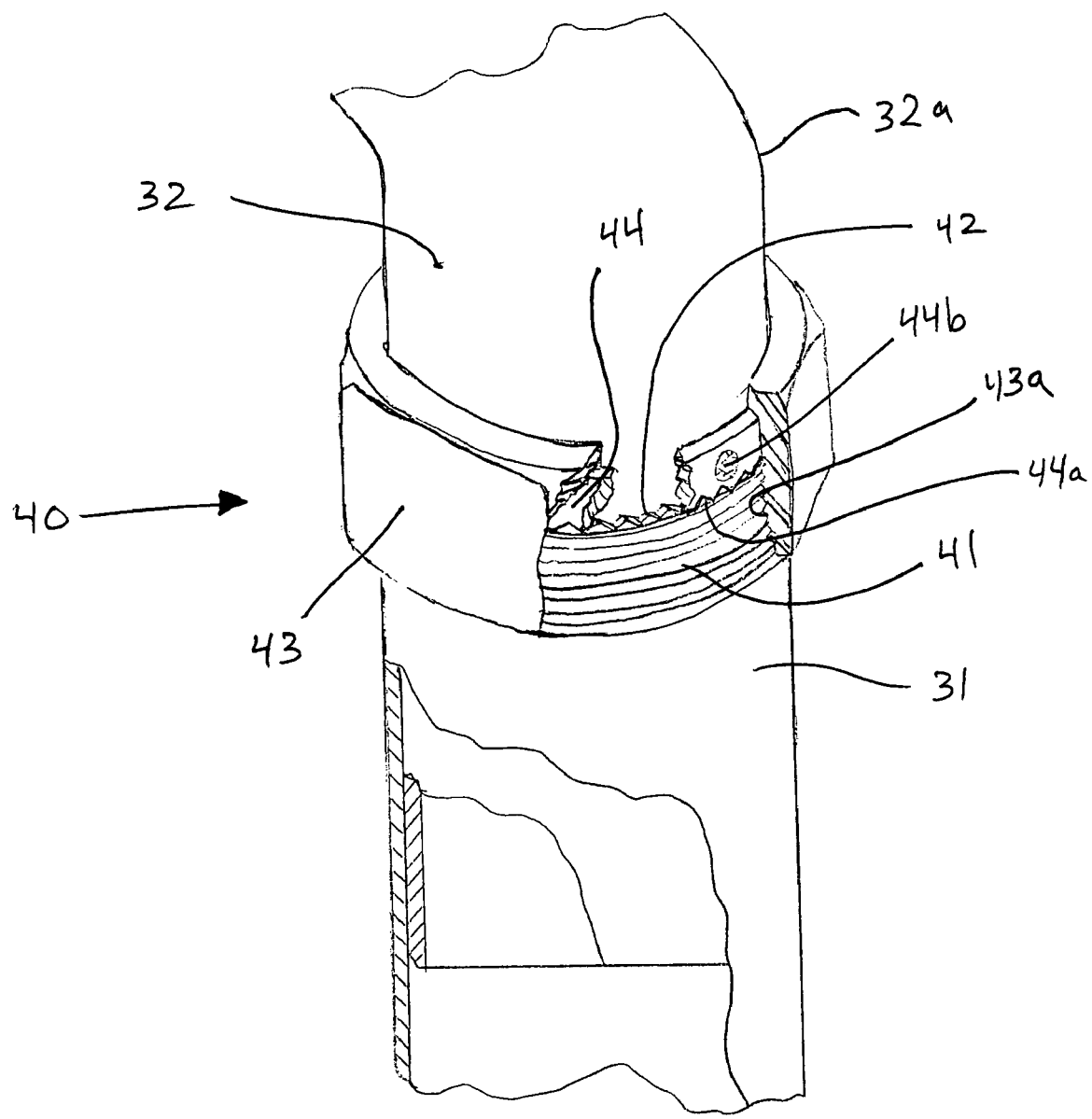
FIG. 2 is an enlarged perspective elevational view, partially in cross section, of a first coupling between a base portion and a post portion of the stand illustrated in FIG. 1, wherein the first coupling is shown in an engaged condition.
Figure 4:
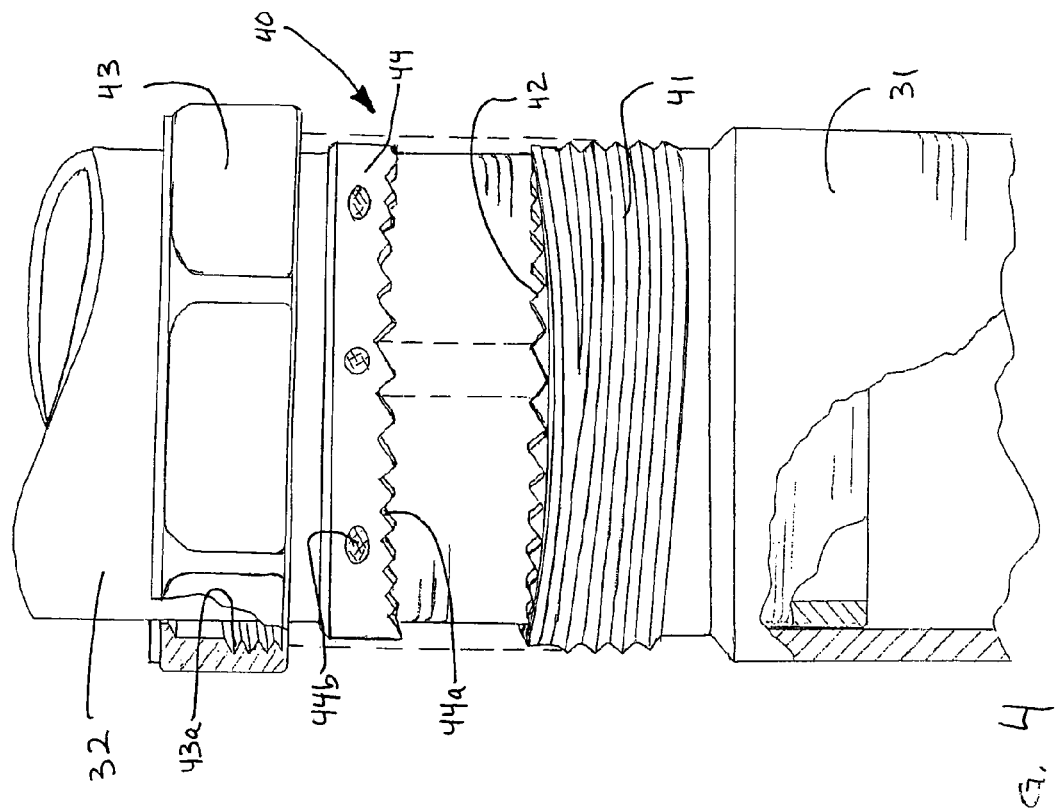
FIG. 4 is an enlarged side elevational view similar to FIG. 3, wherein the first coupling is shown in a fully disengaged condition.
Figure 3:
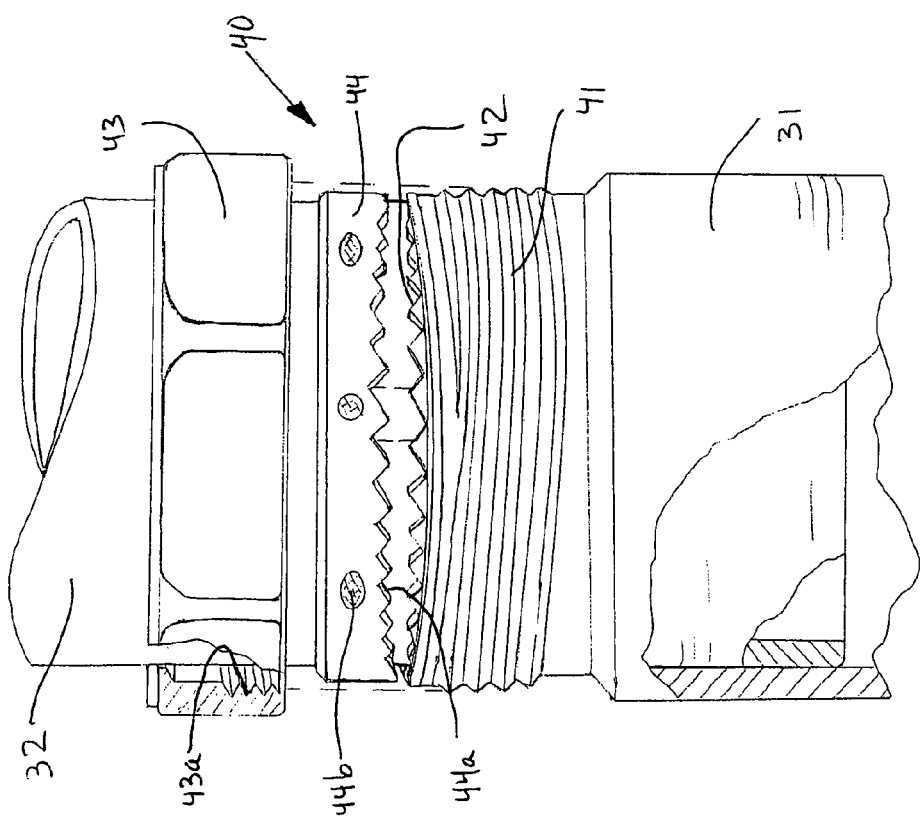
FIG. 3 is a further enlarged side elevational view, partially in cross section, of the first coupling illustrated in FIGS. 1 and 2, wherein the first coupling is shown in a partially disengaged condition.

The lower end of the intermediate member 32 has an outer surface that is smaller in diameter than an inner surface of the upper end of the lower member 31. As a result, as best shown in FIGS. 2, 3, and 4, the lower end of the intermediate member 32 can be received within and supported on the inner surface of the upper end of the lower member 31, while allowing relative rotational movement therebetween. Preferably, the outer surface of the lower end of the intermediate member 32 is only slightly smaller in diameter than the inner surface of the upper end of the lower member 31, thereby allowing the lower end of the intermediate member 32 to be journaled within the upper end of the lower member 31 for relative rotational movement without any substantial axial misalignment therebetween.

Similarly, the upper end of the intermediate member 32 has an outer surface that is smaller in diameter than an inner surface of the lower end of the upper member 33. As a result, as shown in FIG. 1, the upper end of the intermediate member 32 can be received within and supported on the inner surface of the lower end of the upper member 33, while allowing relative rotational movement therebetween. Preferably, the outer surface of the upper end of the intermediate member 32 is only slightly smaller in diameter than the inner surface of the lower end of the upper member 33, thereby allowing the upper end of the intermediate member 32 to be journaled within the lower end of the upper member 33 for relative rotational movement without any substantial axial misalignment therebetween.

The lower end of the lower member 31 is secured to the upper panel 21 of the base portion 20 of the stand 10 about the opening 21*a* and extends upwardly therefrom. To accomplish this, the lower end of the lower member 31 can be welded, such as shown at 21*b*, to the upper panel 21 of the base portion 20. However, the lower end of the lower member 31 may be secured to the upper panel 21 of the base portion 20 in any desired manner.

A first coupling, indicated generally at 40, is provided for preventing axial and rotational movement of the upper end of the lower member 31 relative to the lower end of the intermediate member 32. The first coupling 40 includes a first axial retention structure 41 and a first rotational retention structure 42, both of which are provided on the upper end of the lower member 31. The first axial retention structure 41 is, in the illustrated embodiment, a conventional helical thread that is formed or otherwise provided on the outer surface of the upper end of the lower member 31. However, the first axial retention structure 41 may be embodied as any structure or combination of structures that can limit or prevent axial movement of the upper end of the lower member 31 relative to the lower end of the intermediate member 32. The first rotational retention structure 42 is, in the illustrated embodiment, a conventional serrated surface that is formed or otherwise provided on the uppermost axial end of the upper end of the lower member 31. However, the first rotational retention structure 42 may be embodied as any structure or combination of structures that can limit or prevent rotational movement of the upper end of the lower member 31 relative to the lower end of the intermediate member 32.

The first coupling 40 further includes a second axial retention structure 43 and a second rotational retention structure 44, both of which are provided on the lower end of the intermediate member 32. The second axial retention structure 43 is, in the illustrated embodiment, a coupling nut that is rotatably supported on the outer surface of the lower end of the intermediate member 32. The illustrated coupling nut 43 has a conventional helical thread 43*a* that is formed or otherwise provided on an inner surface thereof that is complementary with the thread 41 that is provided on the outer surface of the upper end of the lower member 31. However, the second axial retention structure 43 may be embodied as any structure or combination of structures that, in cooperation with the first axial retention structure 41, can limit or prevent axial movement of the upper end of the lower member 31 relative to the lower end of the intermediate member 32. The second rotational retention structure 44 is, in the illustrated embodiment, a detent sleeve that is supported on the outer surface of the lower end of the intermediate member 32. The illustrated detent sleeve 44 has a conventional serrated surface 44*a* that is formed or otherwise provided on the lowermost axial end thereof that is complementary with the serrated surface 42 that is provided on the upper end of the lower member 31. The illustrated detent sleeve 44 is secured to the outer surface of the lower end of the intermediate member 32 by a plurality of spot welds 44*b* or by any other desired means. However, the second rotational retention structure 44 may be embodied as any structure or combination of structures that, in combination with the first rotational retention structure 42, can limit or prevent rotational movement of the upper end of the lower member 31 relative to the lower end of the intermediate member 32.

To assemble the intermediate portion 32 of the post portion 30 to the lower portion 31, the lower end of the intermediate portion 32 is initially inserted telescopically within the upper end of the lower portion 31. As this is being done, the intermediate portion 32 is preferably oriented at a desired rotational position relative to the lower portion 31. When the desired relative rotational orientation between the intermediate portion 32 and the lower portion 31 has been achieved, the lower end of the intermediate portion 32 is moved axially downwardly within the upper end of the lower portion 31 until the serrated surface 44*a* of the detent sleeve 44 engages the serrated surface 42 provided on the upper end of the lower portion 31, as best shown in FIG. 2. Such engagement prevents the lower end of the intermediate portion 32 from rotating relative to the upper end of the lower portion 31. Then, the coupling nut 43 is moved downwardly until the thread 43*a* provided therein engages the thread 41 provided on the upper end of the lower member 31. The coupling nut 31 can then be rotated in a first direction relative to the intermediate member 32 and the lower member 31 to engage the threads 41 and 43*a* and thereby prevent the intermediate portion 32 from being moved axially upwardly relative to the lower portion 31, as also best shown in FIG. 2. Consequently, the intermediate portion 32 and the lower portion 31 are fixed in position relative to one another, both axially and rotationally.

To remove the intermediate portion 32 of the post portion 30 from the lower portion 31 (or, alternatively, to reposition the intermediate portion 32 relative to the lower portion 31), the coupling nut 43 is initially rotated in a second direction relative to the intermediate member 32 and the lower member 31 to disengage the threads 41 and 43*a*. Following that, the intermediate portion 32 can be moved axially upwardly relative to the lower portion 31 to separate the serrated surface 44*a* of the detent sleeve 44 from the serrated surface 42 provided on the upper end of the lower portion 31, as shown in FIGS. 3 and 4. This allows the intermediate portion 32 of the post portion 30 to be removed from or repositioned relative to the lower portion 31.

A second coupling, indicated generally at 40', is provided for preventing axial and rotational movement of the upper end of the intermediate member 32 relative to the lower end of the upper member 33. The structure of the second coupling 40' may be the same as the structure of the first coupling 40, and like reference numbers are used to indicate similar parts in FIG. 1. The manner of operation of the second coupling 40' is identical to the manner of operation of the first coupling 40 and, therefore will not be explained in detail. The second coupling 40' allows the upper portion 33 of the post portion 30 to be positioned as desired relative to the intermediate portion 32 or, alternatively, removed from the intermediate portion 32 entirely.

Lastly, as shown in FIG. 1, the stand 10 includes a platform portion, indicated generally at 50, that is supported on the upper end of the upper member 33 of the post portion 30 and is adapted to support an article thereon during use. In the illustrated embodiment, the platform portion 50 of the stand 10 includes a bottom panel 51, three side panels 52 that extend upwardly from the bottom panel 51, and a top panel 53 that extends across the three side panels 52 and at least a portion of the bottom panel 51. Thus, the platform portion 50 of the stand 10 defines an enclosure, within which an article may be disposed and protectively enclosed. As shown in FIG. 1, the bottom panel 51 has an opening 51a formed therethrough. The purpose of this opening 51a will be explained below. The platform portion 50 may be formed from a plurality of sheets of a rigid material, such as metallic plates, that are secured together to form an enclosure. However, it will be appreciated that the platform portion 50 may be formed having any desired structure.

The upper end of the upper member 33 is secured to the bottom panel 51 of the platform portion 50 of the stand 10 about the opening 51a. To accomplish this, the upper end of the upper member 33 can be welded, such as shown at 51b, to the bottom panel 51 of the platform portion 50. However, the upper end of the upper member 33 may be secured to the bottom panel 51 of the platform portion 50 in any desired manner.

The hollow members 31, 32, and 33 of the post portion 30 together provide a passageway that extends from the opening 21a formed through the upper panel 21 of the base portion 20 to the opening 51a formed through the bottom panel 51 of the platform portion 50. This passageway can be used to accommodate a variety of items, such as electrical wires, fluid conduits, and the like, that extend from the platform portion 50 of the stand 10 to the base portion 20 thereof. The passageway protectively encloses such items and prevents them from becoming entangled with people or objects in the area of the stand 10.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A stand for supporting an article relative to a support surface comprising:
    a base portion that is adapted to engage a support surface;
    a post portion including a lower member connected to the base portion, an intermediate member, a first coupling that prevents axial and rotational movement of the lower member relative to the intermediate member, an upper member, and a second coupling that prevents axial and rotational movement of the intermediate member relative to the upper member; and
    a platform portion that is adapted to support an article; wherein
    the first coupling includes a first rotational retention structure that is provided on an upper end of the lower member and a second rotational retention structure that is provided on an upper end of the lower member and cooperates with the first rotational retention structure to prevent rotational movement of the lower member relative to the intermediate member; and wherein
    the first rotational retention structure is a serrated surface and the second rotational retention structure is a detent sleeve having a serrated surface that is complementary with the serrated surface of the first rotational retention structure.

2. The stand defined in claim 1 wherein the intermediate member has a lower end that is received within and supported on an upper end of the lower member, while allowing axial and relative rotational movement therebetween.

3. The stand defined in claim 1 wherein the intermediate member has an upper end that is received within and supported on a lower end of the upper member, while allowing axial and relative rotational movement therebetween.

4. The stand defined in claim 1 wherein the intermediate member has a lower end that is received within and supported on an upper end of the lower member, while allowing axial and relative rotational movement therebetween, and wherein the intermediate member has an upper end that is received within and supported on a lower end of the upper member, while allowing axial and relative rotational movement therebetween.

5. The stand defined in claim 1 wherein the first coupling includes a first axial retention structure that is provided on an upper end of the lower member and a second axial retention structure that is provided on an upper end of the lower member and cooperates with the first axial retention structure to prevent axial movement of the lower member relative to the intermediate member.

6. The stand defined in claim 5 wherein the first axial retention structure is a thread and the second axial retention structure is a coupling nut having a thread that is complementary with the thread of the first axial retention structure.

7. The stand defined in claim 1 wherein the first coupling includes a first axial retention structure that is provided on an upper end of the lower member and a second axial retention structure that is provided on an upper end of the lower member and cooperates with the first axial retention structure to prevent axial movement of the lower member relative to the intermediate member, and wherein the first coupling includes a first rotational retention structure that is provided on an upper end of the lower member and a second rotational retention structure that is provided on an upper end of the lower member and cooperates with the first rotational retention structure to prevent rotational movement of the lower member relative to the intermediate member.

8. The stand defined in claim 7 wherein the first axial retention structure is a thread and the second axial retention structure is a coupling nut having a thread that is complementary with the thread of the first axial retention structure, and wherein the first rotational retention structure is a serrated surface and the second rotational retention structure is a detent sleeve having a serrated surface that is complementary with the serrated surface of the first rotational retention structure.

9. The stand defined in claim 1 wherein the base portion has an opening formed therethrough, the platform portion has an opening formed therethrough, and the lower member, the intermediate member, and the upper member of the post portion are each hollow and provide a passageway that extends from the opening formed through the base portion to the opening formed through the platform portion.

10. A stand for supporting an article relative to a support surface comprising:
    a base portion that is adapted to engage a support surface;
    a post portion including a lower member connected to the base portion, an intermediate member, a first coupling that prevents axial and rotational movement of the lower member relative to the intermediate member, an upper member, and a second coupling that prevents axial and rotational movement of the intermediate member relative to the upper member; and
    a platform portion that is adapted to support an article; wherein the first coupling includes a first axial retention structure that is provided on an upper end of the lower member and a second axial retention structure that is provided on an upper end of the lower member and cooperates with the first axial retention structure to prevent axial movement of the lower member relative to the intermediate member, and wherein the first coupling includes a first rotational retention structure that is provided on an upper end of the lower member and a second rotational retention structure that is provided on an upper end of the lower member and cooperates with the first rotational retention structure to prevent rotational movement of the lower member relative to the intermediate member; and wherein the first axial retention structure is a thread and the second axial retention structure is a coupling nut having a thread that is complementary with the thread of the first axial retention structure, and wherein the first rotational retention structure is a serrated surface and the second rotational retention structure is a detent sleeve having a serrated surface that is complementary with the serrated surface of the first rotational retention structure.

11. The stand defined in claim 10 wherein the intermediate member has a lower end that is received within and supported on an upper end of the lower member, while allowing axial and relative rotational movement therebetween.

12. The stand defined in claim 10 wherein the intermediate member has an upper end that is received within and supported on a lower end of the upper member, while allowing axial and relative rotational movement therebetween.

13. The stand defined in claim 10 wherein the intermediate member has a lower end that is received within and supported on an upper end of the lower member, while allowing axial and relative rotational movement therebetween, and wherein the intermediate member has an upper end that is received within and supported on a lower end of the upper member, while allowing axial and relative rotational movement therebetween.

14. The stand defined in claim 10 wherein the first coupling includes a first axial retention structure that is provided on an upper end of the lower member and a second axial retention structure that is provided on an upper end of the lower member and cooperates with the first axial retention structure to prevent axial movement of the lower member relative to the intermediate member.

15. The stand defined in claim 10 wherein the first axial retention structure is a thread and the second axial retention structure is a coupling nut having a thread that is complementary with the thread of the first axial retention structure.

16. The stand defined in claim 10 wherein the first coupling includes a first rotational retention structure that is provided on an upper end of the lower member and a second rotational retention structure that is provided on an upper end of the lower member and cooperates with the first rotational retention structure to prevent rotational movement of the lower member relative to the intermediate member.

17. The stand defined in claim 16 wherein the first rotational retention structure is a serrated surface and the second rotational retention structure is a detent sleeve having a serrated surface that is complementary with the serrated surface of the first rotational retention structure.

18. The stand defined in claim 10 wherein the base portion has an opening formed therethrough, the platform portion has an opening formed therethrough, and the lower member, the intermediate member, and the upper member of the post portion are each hollow and provide a passageway that extends from the opening formed through the base portion to the opening formed through the platform portion.

* * * * *